United States Patent
Hoefken

(10) Patent No.: US 9,433,879 B2
(45) Date of Patent: Sep. 6, 2016

(54) DECANTER

(71) Applicant: INVENT UMWELT-UND VERFAHRENSTECHNIK AG, Erlangen (DE)

(72) Inventor: Marcus Hoefken, Erlangen (DE)

(73) Assignee: INVENT UMWELT-UND VERFAHRENSTECHNIK AG, Erlangen (DE)

( * ) Notice: Subject to any disclaimer, the term of this patent is extended or adjusted under 35 U.S.C. 154(b) by 212 days.

(21) Appl. No.: 14/362,325

(22) PCT Filed: Nov. 26, 2012

(86) PCT No.: PCT/EP2012/073609
§ 371 (c)(1),
(2) Date: Jun. 2, 2014

(87) PCT Pub. No.: WO2013/083424
PCT Pub. Date: Jun. 13, 2013

(65) Prior Publication Data
US 2014/0353245 A1 Dec. 4, 2014

(30) Foreign Application Priority Data

Dec. 8, 2011 (DE) .................... 10 2011 087 966

(51) Int. Cl.
*B01D 21/24* (2006.01)
*B01D 21/00* (2006.01)
(52) U.S. Cl.
CPC ....... *B01D 21/2444* (2013.01); *B01D 21/0003* (2013.01); *B01D 21/2427* (2013.01)

(58) Field of Classification Search
CPC .......... B01D 21/0003; B01D 21/0024; B01D 21/2427; B01D 21/2433; B01D 21/2444; B01D 17/0214; E02B 15/106
USPC .......................... 210/122, 242.1, 242.3, 540
See application file for complete search history.

(56) References Cited

U.S. PATENT DOCUMENTS

| | | | | |
|---|---|---|---|---|
| 2,782,929 A | * | 2/1957 | Colket | B01D 21/2444 210/540 |
| 3,782,552 A | * | 1/1974 | Wendell | B65D 88/54 210/242.1 |
| 4,290,887 A | * | 9/1981 | Brown | B01D 21/2444 210/242.1 |
| 4,693,821 A | * | 9/1987 | Goronszy | B01D 21/2433 210/242.1 |
| 5,362,386 A | | 11/1994 | Takasugi | |

(Continued)

FOREIGN PATENT DOCUMENTS

DE 190778 12/1906
DE 100 49 132 A1 5/2002

OTHER PUBLICATIONS

PCT, "International Search Report for International Application No. PCT/EP2012/073609".

*Primary Examiner* — Christopher Upton
(74) *Attorney, Agent, or Firm* — Manabu Kanesaka

(57) ABSTRACT

The invention relates to a decanter (2) for separating a supernatant arranged above a sludge in a settlement tank (1), wherein a withdrawal device (5, 16) with a receiving pipe (9, 18), which extends in the manner of a T-piece approximately perpendicular to a discharge pipe (4, 17), is attached to one end of the discharge pipe (4, 17). To reduce the production cost, it is proposed in accordance with the invention for the receiving pipe (9, 18) to be a polygonal pipe produced from sheet metal.

15 Claims, 6 Drawing Sheets

(56) References Cited

U.S. PATENT DOCUMENTS

| | | | |
|---|---|---|---|
| 5,435,924 A * | 7/1995 | Albertson | B01D 21/245 210/525 |
| 5,552,050 A * | 9/1996 | Valentin | B01D 21/2444 210/540 |
| 5,820,751 A * | 10/1998 | Faircloth, Jr. | B01D 21/2444 210/122 |
| 6,287,460 B1 | 9/2001 | Van Schie | |
| 2009/0236278 A1 | 9/2009 | Hoefken | |
| 2015/0114892 A1* | 4/2015 | Hoefken | B01D 21/2444 210/97 |

* cited by examiner

DECANTER

RELATED APPLICATIONS

The present application is National Phase of International Application No. PCT/EP2012/073609 filed Nov. 26, 2012, and claims priority from German Application No. 10 2011 087 966.8, filed Dec. 8, 2011.

The invention relates to a decanter.

Such a decanter is known for example from WO 2008/014856 A1. In the known decanter, a receiving pipe is attached to a discharge pipe in the manner of a T-piece. The discharge pipe and the receiving pipe are produced from solid steel.

The known decanter is of high natural weight. In practice, it is also necessary to pivot the decanter from a position in which it dips into the supernatant into a raised position above the supernatant. In doing so, the receiving pipe is initially filled with supernatant in particular. In the case of a frequently occurring different filling degree of the two branches of the receiving pipe, the heavier branch slopes downward. As a result, supernatant from the other branch follows, which leads to a further inclined position of the receiving pipe. This results, on the whole, in an undesired twisting of the decanter. To counteract this, particularly stable pivot bearing constructions, a torsionally rigid discharge pipe and a particularly powerful apparatus for raising and lowering the decanter are used in accordance with the prior art. The above measures are costly.

The object of the invention is to overcome the disadvantages of the prior art. In particular, a decanter shall be disclosed, the stability of which is improved. In accordance with a further objective of the invention, it shall be possible to produce and operate the decanter at reduced cost.

This object is achieved by the features of the first aspect. Expedient embodiments of the invention result from the features of the second to fourteenth aspects.

In accordance with the invention, the receiving pipe is a polygonal pipe produced from sheet metal. The production of a polygonal pipe from sheet metal requires a relatively low outlay. Surprisingly, such a polygonal pipe is sufficiently stable to withstand the high forces that occur during operation of a decanter. Due to the reduced weight of the receiving pipe proposed in accordance with the invention, an apparatus that can be produced at lower cost can be used to raise and lower the decanter.

In accordance with an advantageous embodiment, the discharge pipe is a further polygonal pipe produced from sheet metal. The decanter may thus also be produced completely from sheet metal, in contrast to the prior art. Such a decanter is particularly lightweight. It can be easily transported, assembled, and operated with an apparatus for raising and lowering that is of simpler design.

The withdrawal device is advantageously substantially symmetrical about a central plane running through the receiving pipe. The polygonal pipe and/or the further polygonal pipe may be formed from a plurality of angled sheet metal elements, preferably interconnected by rivets. Such sheet metal elements can be produced in a simple and cost effective manner. It has surprisingly been found that even just a connection of the sheet metal elements by rivets ensures a sufficient stability of the polygonal pipe and of the further polygonal pipe. Such a connection can be produced in a simple and cost effective manner.

In accordance with an advantageous embodiment, a cross-sectional area of the polygonal pipe reduces on either side of the central plane. That is to say, a cross section of the receiving pipe tapers toward each of its two free ends. A uniform flow rate of the supernatant in the receiving pipe can thus be achieved over the entire length of the receiving pipe. Swirling caused by a change in the flow rate over the length of the receiving pipe can be reduced or avoided. Compared to the receiving pipe of constant cross sectional area known from the prior art, a larger amount of supernatant can be guided through the receiving pipe according to the invention per unit of time.

In accordance with a further embodiment of the invention, the polygonal pipe has a multiplicity of apertures for passage of the supernatant. In this case, the apertures are expediently arranged in at least one aperture plane arranged perpendicular to the central plane. The proposed provision of a multiplicity of apertures arranged side by side contributes to the fact that the supernatant initially flows into the receiving pipe approximately parallel to an axis of the expediently circular or rectangular apertures. This also contributes to a homogenisation of the flow within the receiving pipe and thus to an improved throughput.

In accordance with a further embodiment, at least one flow resistance element, preferably a sheet metal element or perforated sheet metal element, is provided within the polygonal pipe for homogenisation of a flow rate. The sheet metal element or perforated sheet metal element is expediently attached in the region of the central plane. Sheet metal elements or perforated sheet metal elements may also be provided on either side of the central plane, preferably in symmetrical arrangement. The provision of the at least one sheet metal element or perforated sheet metal element counteracts a flow directed from one branch of the receiving pipe to the other branch of the receiving pipe. When the receiving pipe is raised from the supernatant, an undesired inclined position of the withdrawal device can thus be counteracted.

A deflection device produced from angled sheet metal is expediently attached to an outer face of the polygonal pipe. Such a deflection device is used to retain dirt and counteracts a blocking of the downstream apertures.

The deflection device is advantageously attached by means of spacers at a predefined distance from the apertures. The predefined distance is expediently equal to or less than a diameter of the apertures. If a diameter of the apertures changes from the free end of a branch of the receiving pipe toward the central plane, the predefined distance of the deflection device may change correspondingly.

In accordance with a further embodiment, the withdrawal device is provided approximately centrally with a connection piece for connection to the discharge pipe. The connection piece is used to merge the supernatant flowing through the two branches of the receiving pipe and to convey it into the discharge pipe. The connection piece is further designed such that the withdrawal device is attached releasably thereby to the discharge pipe, that is to say can be disassembled from the discharge pipe for maintenance or repair purposes.

The connection piece is expediently integrated into the polygonal pipe. The connection piece may likewise be produced from angled sheet metal. In this case, it is expediently box-shaped.

In accordance with the invention, the term "withdrawal device" is understood on the whole to mean the device which is attached to the discharge pipe in the manner of a T-piece and which comprises the receiving pipe, the deflection device including spacers, the connection piece, etc.

In accordance with a further embodiment, the polygonal pipe and/or the further polygonal pipe is/are a 5-sided, 6-sided, 7-sided or 8-sided polygonal pipe. The sheet metal element may be a high-grade steel plate having a thickness in the range from 0.4 to 3.5 mm. The thickness of the sheet metal element expediently lies in the range from 1.0 to 2.0 mm.

An exemplary embodiment of the invention will be explained in greater detail hereinafter on the basis of the drawings, in which.

Figure 1:
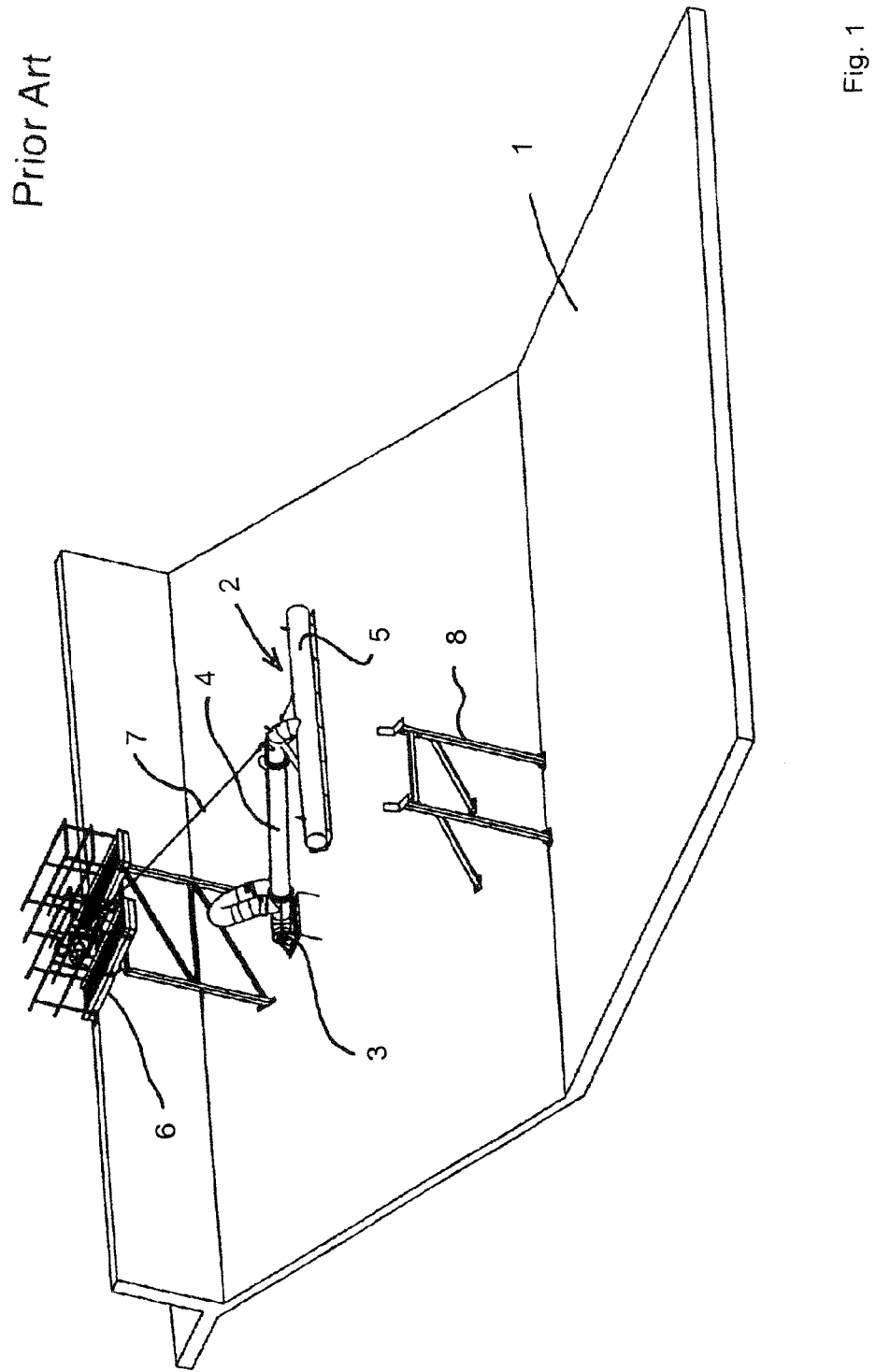
FIG. 1 shows a perspective view of a decanter according to the prior art.
Figure 2:
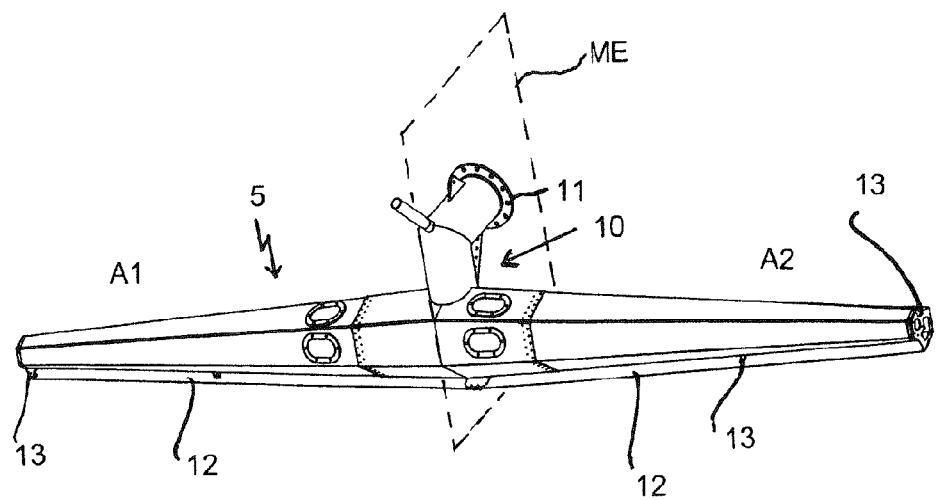
FIG. 2 shows a perspective view of a first withdrawal device.

In FIG. 1, a decanter denoted generally by reference sign 2 is attached pivotably about a pivot bearing 3 in a schematically indicated settlement tank 1. The decanter 2 comprises a discharge pipe 4. One end of the discharge pipe 4 is held pivotably in the pivot bearing 3. At the other end of the discharge pipe 4, a withdrawal device 5 is attached in the manner of a T-piece. Reference sign 6 denotes a hoisting apparatus for raising and lowering the decanter 2. The hoisting apparatus 6 for example comprises a winch with a cable 7, of which the end is fastened in the region of the withdrawal device 5. Reference sign 8 denotes a support device for supporting the decanter 2 in a rest position.

FIGS. 2 to 5 show an exemplary embodiment of a first withdrawal device 5 according to the invention. A first receiving pipe 9 formed as a polygonal pipe has two branches A1, A2, which extend on either side of a first connection piece 10 integrated into the first receiving pipe 9. The first connection piece 10 may have a flange 11 for connection to a conventional discharge pipe 4. As can be seen in particular from FIG. 2, a cross-sectional area of the receiving pipe 9 tapers on either side of a central plane denoted by reference sign ME in the direction of each of the free ends of the two branches A1, A2. A deflection device 12 produced from an angled sheet metal plate is attached to the first receiving pipe 9 by means of a plurality of spacers 13, which likewise may be produced from sheet metal. The withdrawal device 5 is formed symmetrically about the central plane ME, apart from inspection openings which are provided optionally.

Figure 3:
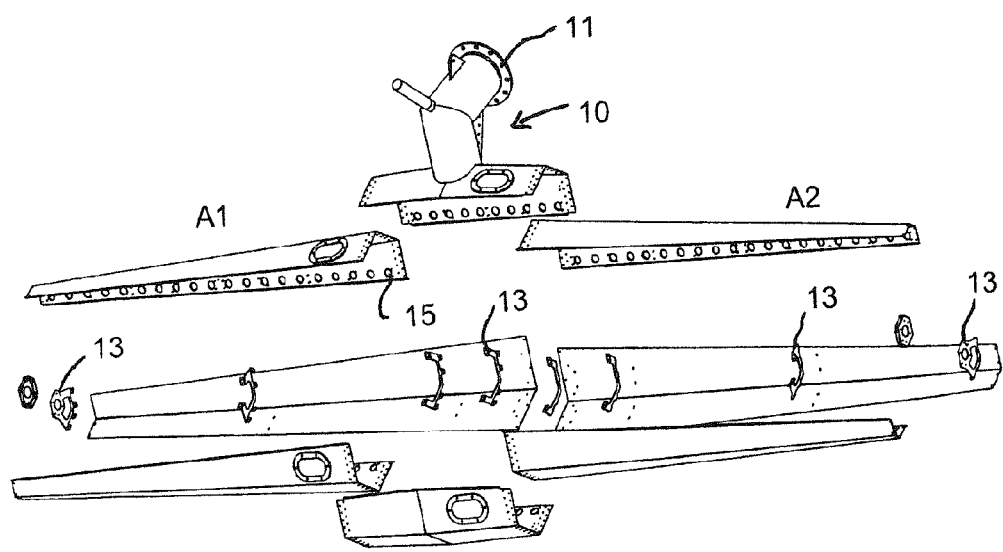
FIG. 3 shows an exploded view according to FIG. 2.
Figure 4:
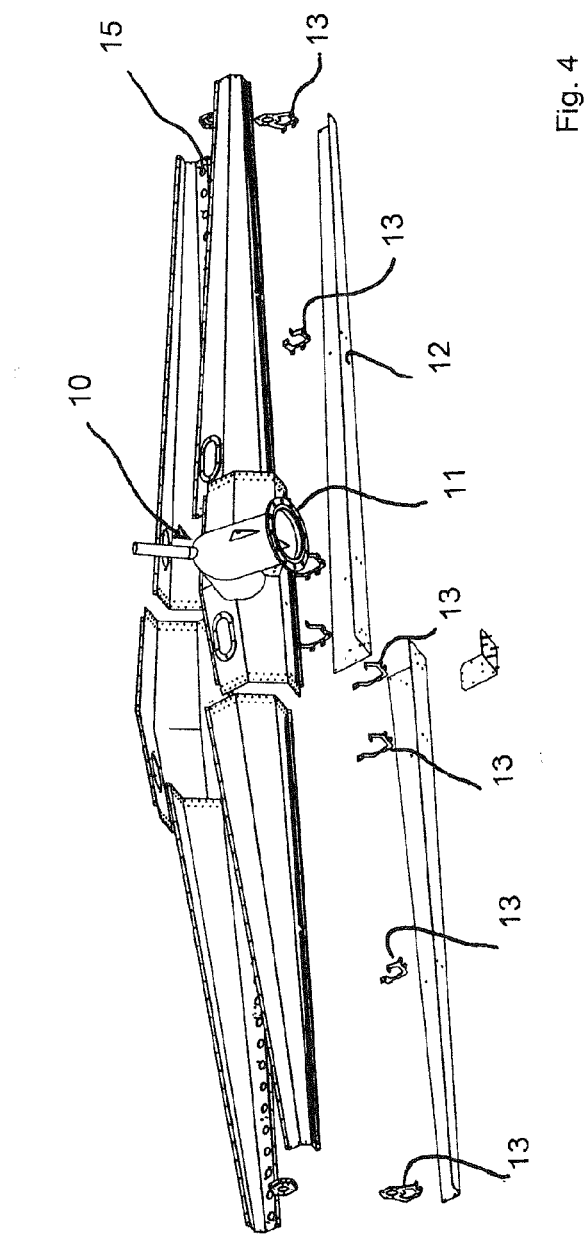
FIG. 4 shows a further exploded view according to FIG. 2.

As can be seen in particular from FIGS. 3 and 4, the first receiving pipe 9 and a portion 14 integrated therein of the first connection piece 10 are produced from angled sheet metal elements. The sheet metal elements each have apertures 15, which are arranged in a row, side by side.

Figure 5:
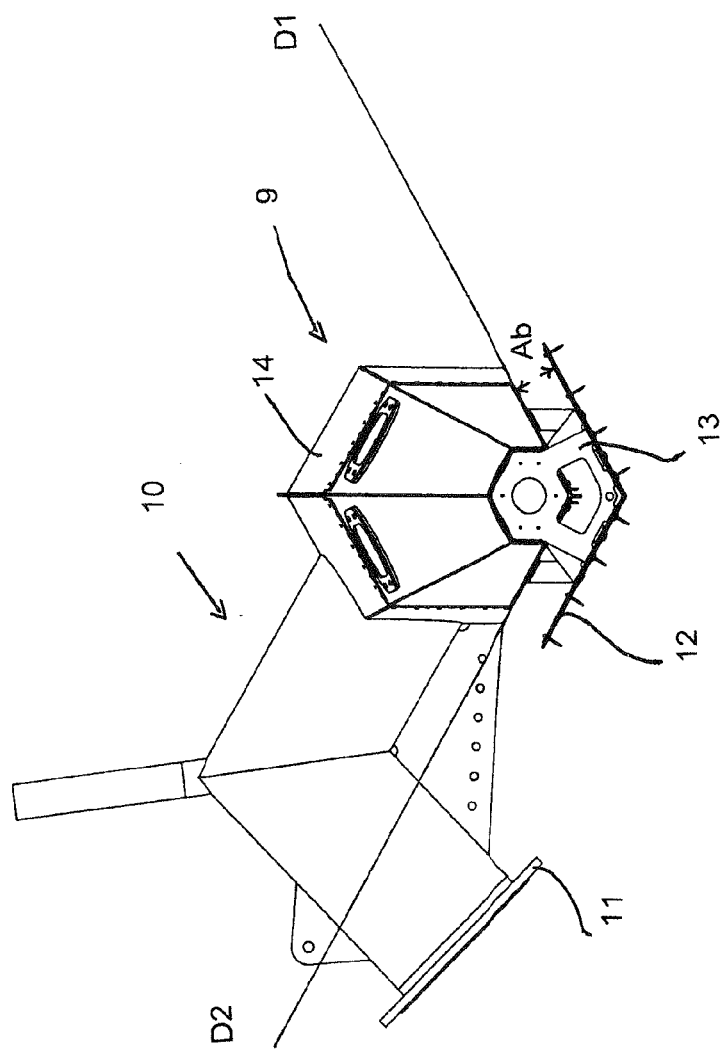
FIG. 5 shows a side view of the first withdrawal device according to FIG. 2.

As can be seen in particular with comparison of FIG. 5, a 6-sided polygonal pipe having two rows of apertures 15, which are arranged opposite the deflection device 12 formed from an angled sheet metal plate, is formed by the connection of the sheet metal elements. In this case, the apertures 15 lie in aperture planes D1, D2, which run perpendicular to the central plane ME. The central plane ME corresponds in FIG. 5 to the drawing plane. A distance Ab between the deflection device 12 and the apertures 15 is predefined and is preferably less than or equal to a diameter of the apertures 15.

The first withdrawal device 5 shown in FIGS. 2 to 5 is expediently produced from angled high-grade steel plate elements having a thickness in the range from 0.4 to 3.5 mm, preferably 1.0 to 2.0 mm. The high-grade steel plate elements are advantageously interconnected by means of rivets.

Figure 6:
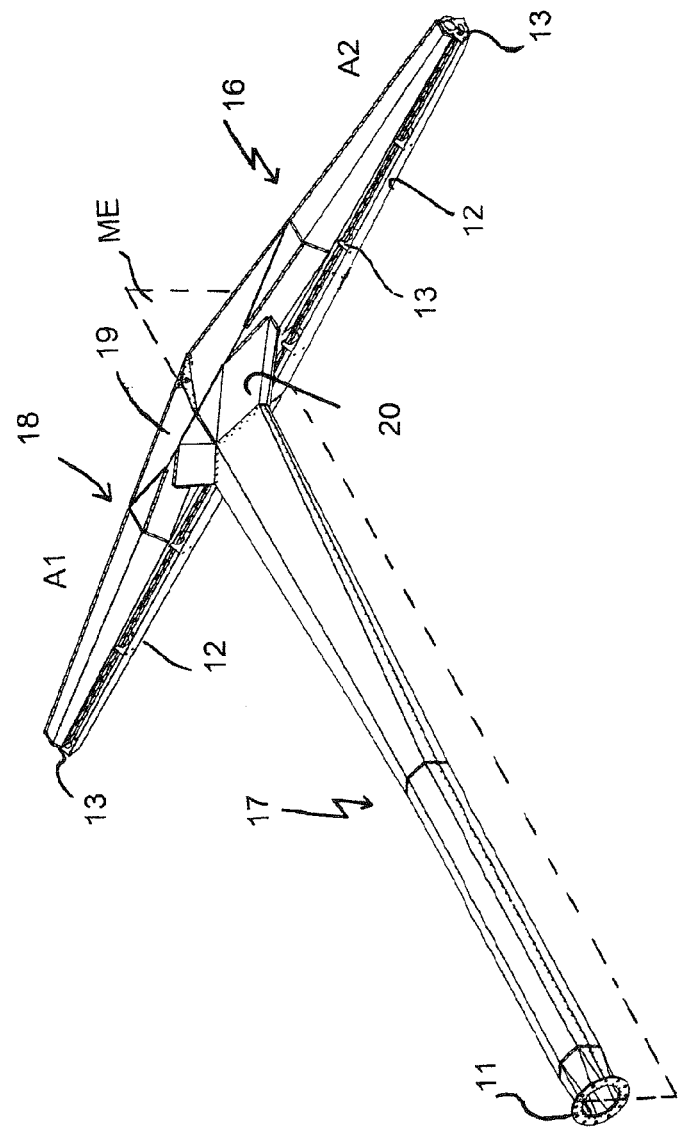
FIG. 6 shows a perspective view of a second withdrawal device with a discharge pipe.
Figure 7:
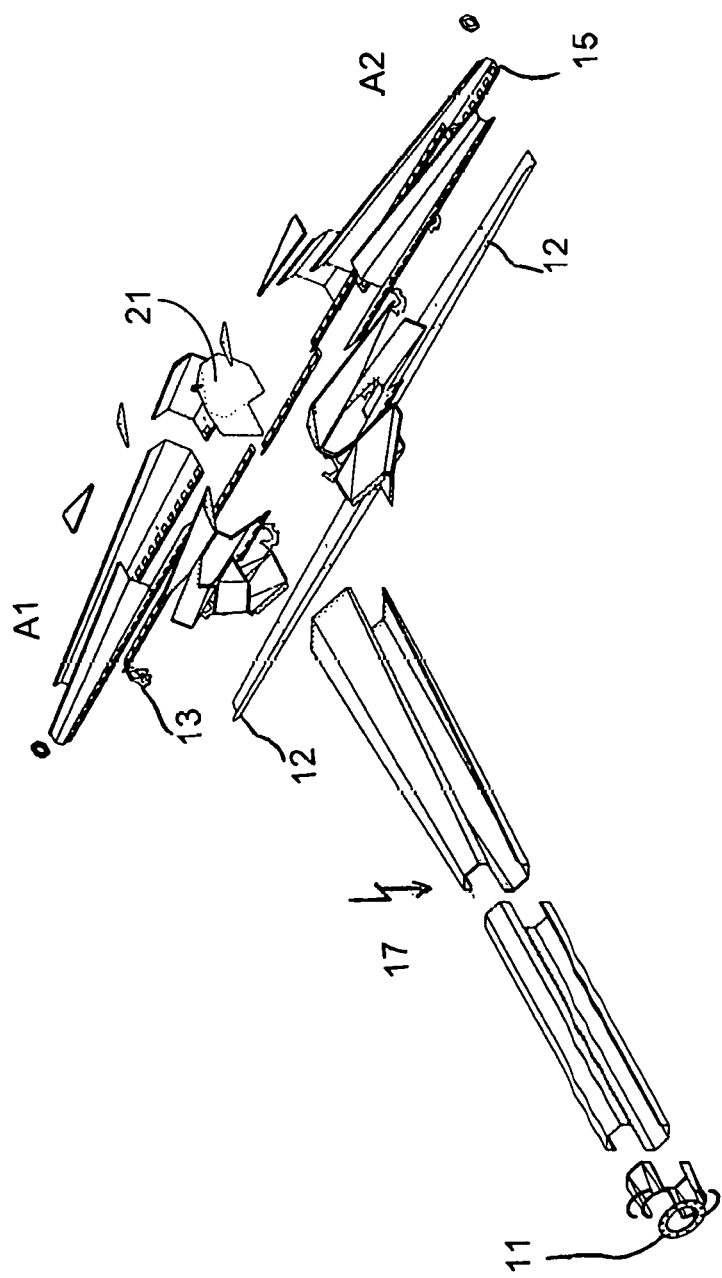
FIG. 7 shows an exploded view according to FIG. 6.

FIGS. 6 and 7 show a second withdrawal device 16, which is connected fixedly to an angled discharge pipe 17 formed from a further polygonal pipe. The second withdrawal device 16 is produced from angled sheet metal plates, similarly to the first withdrawal device 5. It has a second receiving pipe 18, formed as a polygonal pipe, with branches A1, A2 tapering in cross section toward the free ends of said receiving pipe. The two branches A1, A2 are connected to a second connection piece 19, which is in turn produced from angled sheet metal elements. The second connection piece 19 has a connection portion 20, which, in contrast to the first withdrawal device 5, is produced from angled sheet metal plates. The connection portion 20 is formed similarly to a pyramid frustum. A large area of the pyramid frustum discharges into the second connection piece 19, and a small area of the pyramid frustum discharges into the angled discharge pipe 17. A particularly torsionally rigid attachment of the second receiving pipe 18 to the angled discharge pipe 17 is thus produced.

As can be seen in particular from FIG. 7, the angled discharge pipe 17 is again composed from a plurality of angled sheet metal elements. It has a hexagonal outline, which is formed symmetrically about the central plane ME. The flange 11 is provided at the free end of the angled discharge pipe 17 and can be connected to a conventional pivot bearing 3.

Although not shown in the figures, suitably arranged flow-guiding sheet metal plates or perforated sheet metal plates may be attached within the receiving pipe 9. In particular, a perforated sheet metal plate may be provided in the region of the central plane ME. Perforated sheet metal plates running parallel to the central plane ME on either side thereof may also be provided.

LIST OF REFERENCE SIGNS 1 settlement tank
2 decanter
3 pivot bearing
4 discharge pipe
5 first withdrawal device
6 hoisting apparatus
7 cable
8 support device
9 first receiving pipe
10 first connection piece
11 flange
12 deflection device
13 spacer
14 portion
15 aperture
16 second withdrawal device
17 angled discharge pipe
18 second receiving pipe
19 second connection piece
20 connection portion
21 flow resistance element
A1 first branch
A2 second branch
Ab distance
D1 first aperture plane
D2 second aperture plane
ME central plane

The invention claimed is:

1. A decanter for separating a supernatant arranged above a sludge in a settlement tank, wherein a withdrawal device with a receiving pipe, which extends in the manner of a T-piece approximately perpendicular to a discharge pipe, is attached to one end of the discharge pipe, wherein the other end of the discharge pipe is held pivotably in a pivot bearing, wherein the receiving pipe is a polygonal pipe which is produced from a plurality of stainless steel plate elements having a thickness in a range from 0.4 to 3.5 mm which are interconnected by rivets.

2. The decanter according to claim 1, wherein the discharge pipe is a further polygonal pipe produced from a sheet metal.

3. The decanter according to claim 2, wherein the further polygonal pipe is formed from a plurality of further angled stainless steel plate elements.

4. The decanter according to claim 3, wherein the further stainless steel plate elements have a thickness in a range of 0.4 to 3.5 mm.

5. The decanter according to claim 2, wherein the polygonal pipe and/or the further polygonal pipe is/are a 5-sided, 6-sided, 7-sided or 8-sided polygonal pipe.

6. The decanter according to claim 1, wherein the withdrawal device is formed substantially symmetrically about a central plane running through the receiving pipe.

7. The decanter according to claim 6, wherein a cross-sectional area of the polygonal pipe reduces on either side of the central plane.

8. The decanter according to claim 6, wherein the polygonal pipe has a multiplicity of apertures for passage of the supernatant.

9. The decanter according to claim 8, wherein the apertures are arranged in at least one aperture plane disposed perpendicular to the central plane.

10. The decanter according to claim 8, wherein a deflection device produced from an angled sheet metal is attached to an outer face of the polygonal pipe.

11. The decanter according to claim 10, wherein the deflection device is attached by means of spacers at a predefined distance from the apertures.

12. The decanter according to claim 1, wherein at least one flow resistance element is provided within the polygonal pipe for homogenisation of a flow rate.

13. The decanter according to claim 1, wherein the withdrawal device is provided approximately centrally with a connection piece for connection to the discharge pipe.

14. The decanter according to claim 13, wherein the connection piece is integrated into the polygonal pipe.

15. The decanter according to claim 1, wherein the stainless steel plate elements have the thickness in the range from 1.0 to 2.0 mm.

* * * * *